United States Patent
Chen

(10) Patent No.: US 8,537,534 B2
(45) Date of Patent: Sep. 17, 2013

(54) HDD MOUNTING ASSEMBLY AND COMPUTER CASE HAVING SAME

(75) Inventor: Xiao-Zhu Chen, Shenzhen (CN)

(73) Assignees: Hong Fu Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 392 days.

(21) Appl. No.: 12/982,923

(22) Filed: Dec. 31, 2010

(65) Prior Publication Data

US 2012/0155008 A1    Jun. 21, 2012

(30) Foreign Application Priority Data

Dec. 16, 2010    (CN) .......................... 2010 1 0591518

(51) Int. Cl.
*G06F 1/16*    (2006.01)
(52) U.S. Cl.
USPC .................................................... 361/679.33
(58) Field of Classification Search
USPC .................................................... 361/679.33
See application file for complete search history.

(56) References Cited

U.S. PATENT DOCUMENTS

| | | | |
|---|---|---|---|
| 6,317,317 B1 * | 11/2001 | Lu et al. ................... | 361/679.33 |
| 6,775,132 B2 * | 8/2004 | Chen et al. ............... | 361/679.33 |
| 7,251,099 B2 * | 7/2007 | Kao et al. ................. | 361/679.33 |
| 7,382,610 B2 * | 6/2008 | Lin et al. .................. | 361/679.33 |
| 7,391,608 B2 * | 6/2008 | Tsai .......................... | 361/679.33 |
| 7,703,291 B2 * | 4/2010 | Bushnik et al. ................ | 62/3.2 |
| 7,911,776 B2 * | 3/2011 | Ikeda et al. .............. | 361/679.33 |
| 7,969,725 B2 * | 6/2011 | Dai ........................... | 361/679.37 |
| 7,969,726 B2 * | 6/2011 | Dai ........................... | 361/679.37 |
| 8,050,026 B2 * | 11/2011 | Chang ...................... | 361/679.33 |
| 8,083,197 B2 * | 12/2011 | Zhang et al. ............... | 248/309.1 |
| 8,132,869 B2 * | 3/2012 | Wang et al. ................ | 312/223.2 |
| 8,248,778 B2 * | 8/2012 | Dai ........................... | 361/679.37 |
| 2002/0051338 A1 * | 5/2002 | Jiang et al. ..................... | 361/685 |
| 2002/0054475 A1 * | 5/2002 | Boss et al. ..................... | 361/685 |
| 2005/0135057 A1 * | 6/2005 | Mihara et al. ................. | 361/685 |
| 2007/0230106 A1 * | 10/2007 | Yeh .............................. | 361/685 |

* cited by examiner

Primary Examiner — Lisa Lea Edmonds
(74) Attorney, Agent, or Firm — Altis Law Group, Inc.

(57) ABSTRACT

A hard disk drive (HDD) mounting assembly includes a fixing plate and a cover thereon including a side plate perpendicular to the fixing plate and a top plate opposite to the fixing plate. The side plate includes a first through hole defined therein and a first fastener corresponding to the first through hole. A HDD of a first size is fixed in the HDD mounting assembly by the first fastener through the first through hole. The top plate includes a second through hole defined therein and a second fastener corresponding to the second through hole. A HDD of a second size is fixed in the HDD mounting assembly by the second fastener through the second through hole, and the first size is different from the second size.

10 Claims, 5 Drawing Sheets

US 8,537,534 B2

HDD MOUNTING ASSEMBLY AND COMPUTER CASE HAVING SAME

BACKGROUND

1. Technical Field

The disclosure generally relates to computer hardware housing, and particularly to a mounting assembly for receiving and seating a hard disk drive (HDD) therein, and a computer case having the same.

2. Description of Related Art

While a hard disk drive (HDD) mounting assembly in a computer case may be configured for a single type of drive, such as a 3.5-inch HDD (LFF) or 2.5-inch HDD (SFF), it is often unable to adapt to both types and must be replaced if a different size of drive is to be installed.

Therefore, it is desirable to provide a HDD mounting assembly capable of overcoming the limitations described.

BRIEF DESCRIPTION OF THE DRAWINGS

Many aspects of the disclosure can be better understood with reference to the following drawings. The components in the drawings are not necessarily drawn to scale, the emphasis instead being upon clearly illustrating the principles of the disclosures. Moreover, in the drawings, like reference numerals designate corresponding parts throughout the different views.

DETAILED DESCRIPTION

Figure 1:
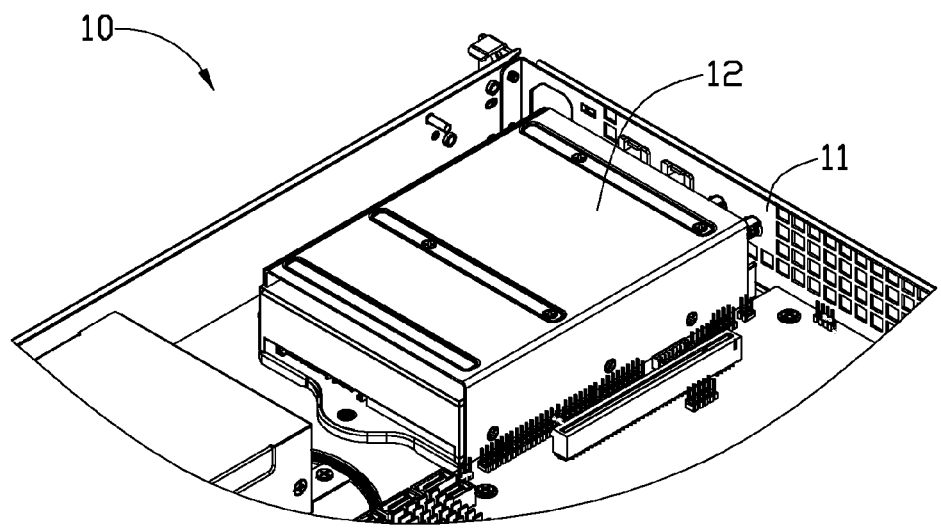
FIG. 1 is a schematic view of an exemplary embodiment of a computer case with a HDD mounting assembly in accordance with the disclosure.

Referring to FIG. 1, a computer case 10 in accordance with an exemplary embodiment of the present disclosure includes a shell 11 and a HDD mounting assembly 12 assembled on the shell 11. Detailedly, the computer case 10 may be a personal PC case or a server case.

Figure 2:
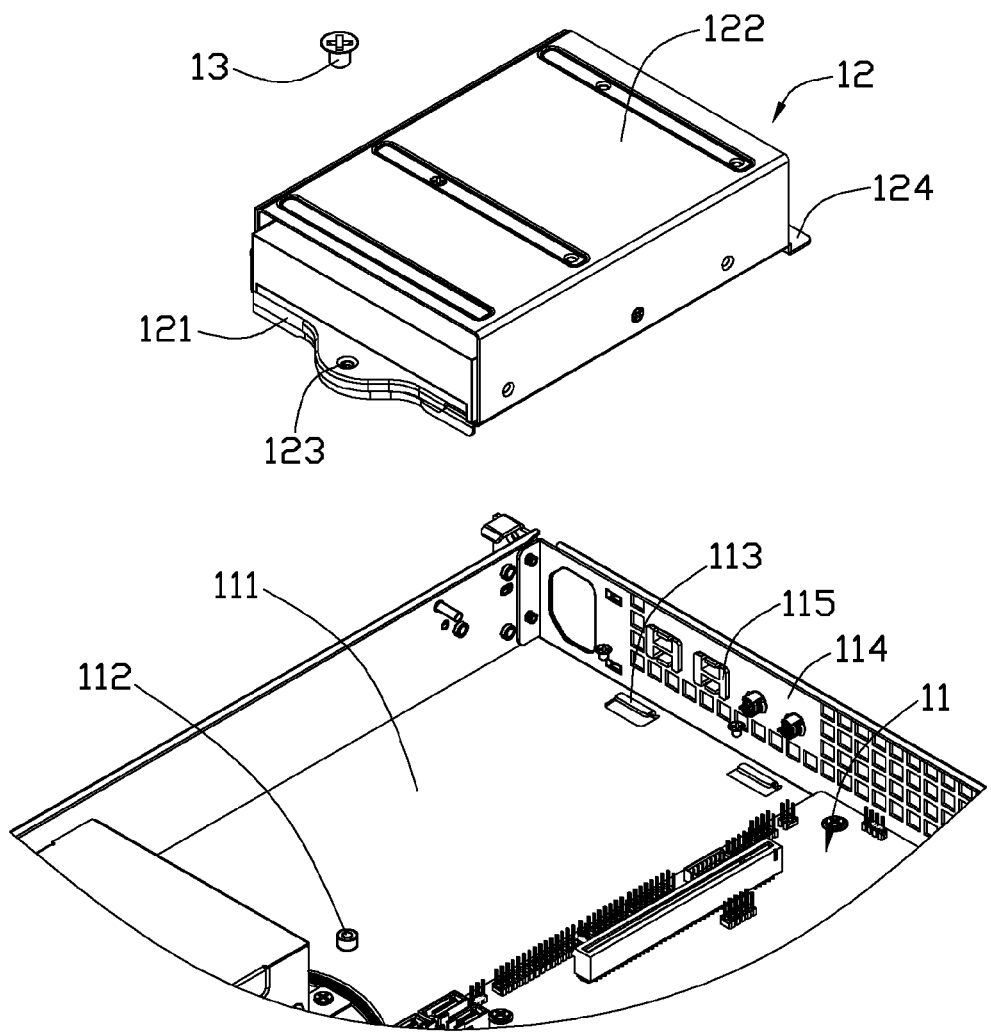
FIG. 2 is a disassembled, schematic front view of the computer case in FIG. 1.

Referring to FIG. 2, the shell 11 includes a bottom plate 111 for holding computer hardware, such as an HDD, motherboard, power supply or others. The bottom plate 111 has a threaded post 112 and tabs 113 defined therein, by which the HDD mounting assembly 12 is fixed on the bottom plate 111. The HDD mounting assembly 12 is installed in proximity to access openings 115 defined in a sidewall 114 of the shell 11, enabling connection thereto.

The HDD mounting assembly 12 includes a fixing plate 121 abutting the bottom plate 111 of the shell 11, and a cover 122. A fixing through hole 123 is defined in one end of the fixing plate 121, and a flange 124 is located at the other end of the fixing plate 121 opposite to the fixing through hole 123. In the present embodiment, the flange 124 received by the tabs 113 of the bottom plate 111, and a fastener 13 received in the threaded post 112 of the bottom plate 111 through the fixing through hole 123 defined in the fixing plate 121, so that the HDD mounting assembly 12 can be fixed on the bottom plate 111 of the shell 11. It can be understood that, the fastener 13 may be a screw or an elastic member.

Because the fixing through hole 123 defined in the fixing plate 121 is opposite the flange 124, the threaded post 112 and the tabs 113 respectively corresponding to the fixing through hole 123 and the flange 124 provide stable retention of the HDD mounting assembly 12 on the bottom plate 111 of the shell 11.

Figure 3:
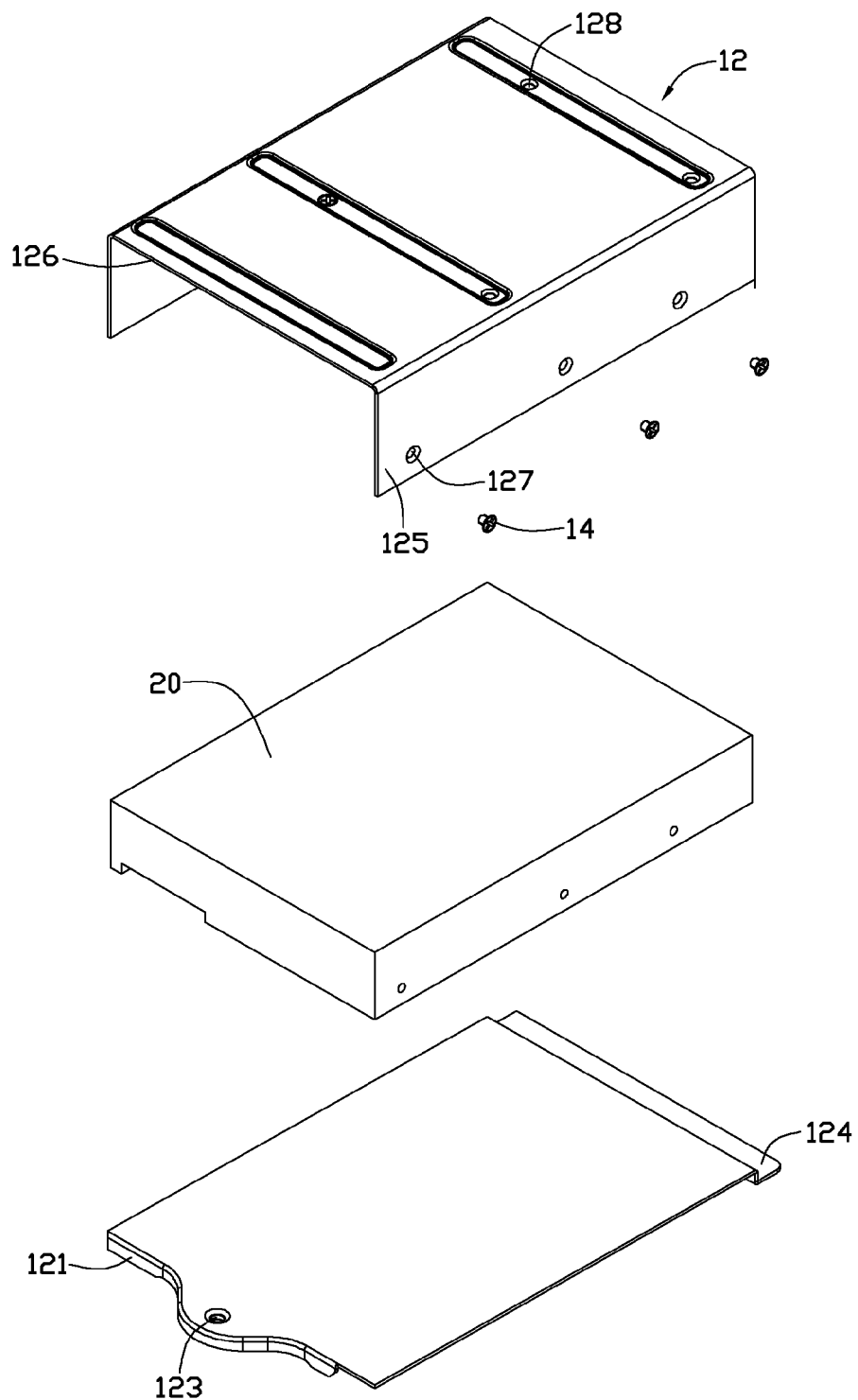
FIG. 3 is an exploded, schematic front view of the HDD mounting assembly of FIG. 2 configured for receiving a HDD of a first size.
Figure 4:
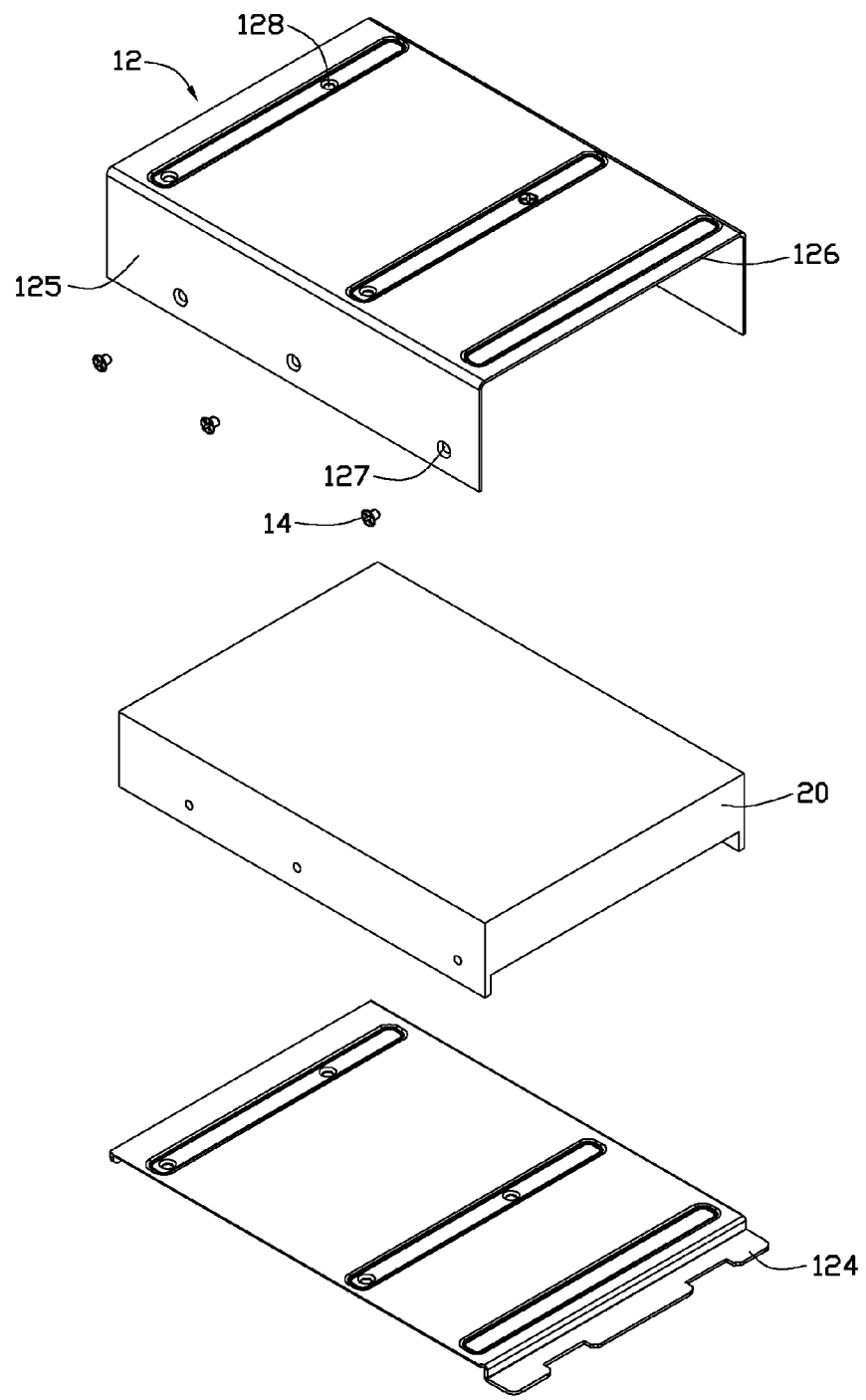
FIG. 4 is an exploded, schematic rear view of the HDD mounting assembly of FIG. 2 configured for receiving the HDD of a first size.

Referring to FIGS. 3 and 4, the HDD mounting assembly 12 is configured for receiving and holding a HDD 20 of a first size. In the present embodiment, the first size is 3.5-inch. The cover 122 of the HDD mounting assembly 12 has a side plate 125 perpendicular to the fixing plate 121, and a top plate 126 opposite to the fixing plate 121. The side plate 125 has a number of first through holes 127 defined therein, and the top plate 126 has a number of second through holes 128 defined therein. In the present embodiment, the HDD 20 is fixed in the HDD mounting assembly 12 by a number of fasteners 14 (such as screws) passing through the first through holes 127 respectively.

Figure 5:
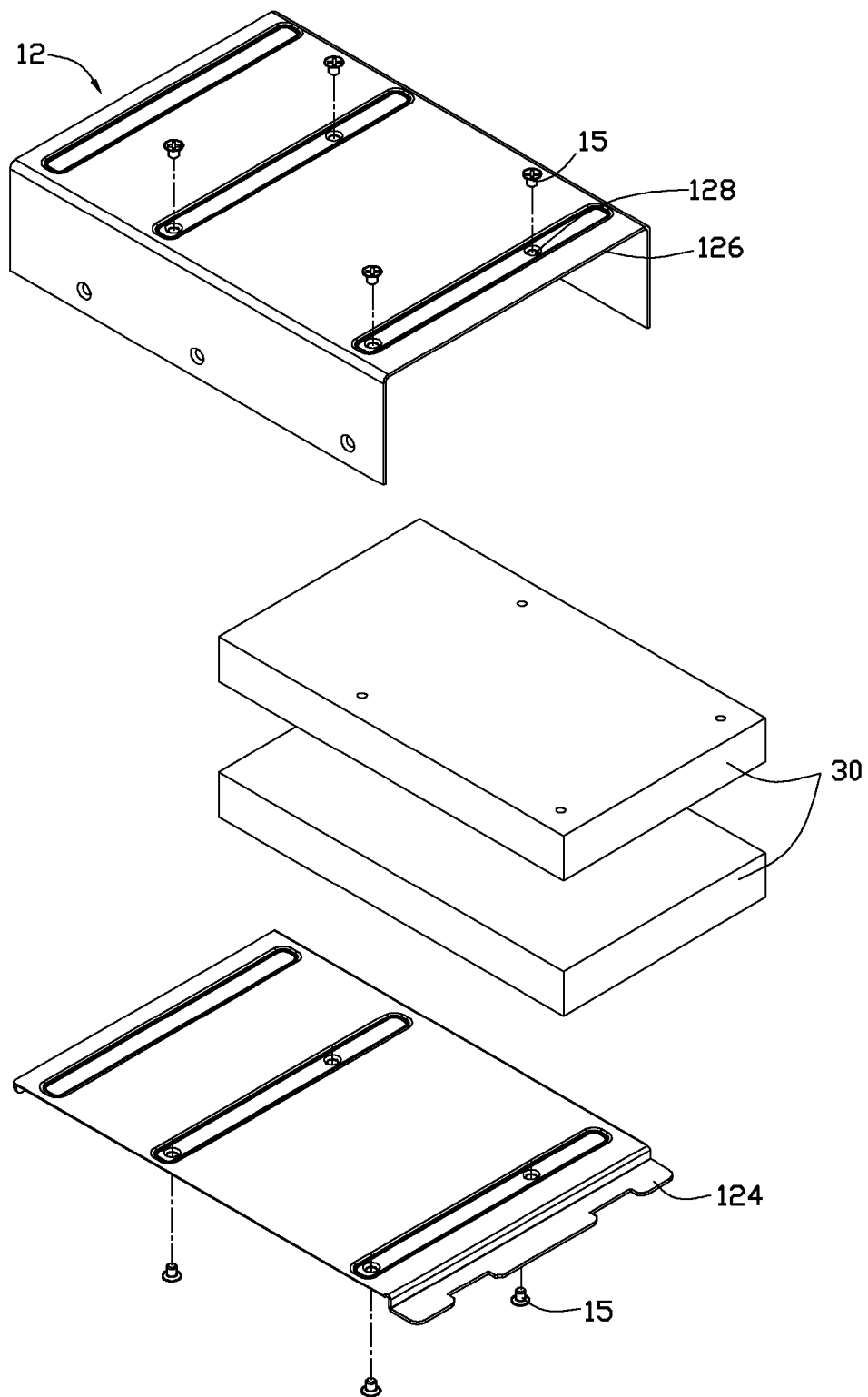
FIG. 5 is an exploded, schematic view of the HDD mounting assembly of FIG. 2 configured for receiving a HDD of a second size.

Referring to FIG. 5, the HDD mounting assembly 12 can be configured for receiving and holding a HDD 30 of a second size. In the present embodiment, the second size is 2.5-inch. In the present embodiment, the HDD 30 is fixed in the HDD mounting assembly 12 by a number of fasteners 15 (such as screws) through the second through holes 128 respectively. The HDD mounting assembly 12 can receive two 2.5-inch HDDs or one 3.5-inch HDD therein. The cover 122 (see FIG. 1) of the HDD mounting assembly 12 has a side plate 125 (see FIG. 3) perpendicular to the fixing plate 121, and a top plate 126 opposite to the fixing plate 121. The side plate 125 has a number of first through holes 127 defined therein, and the top plate 126 has a number of second through holes 128 defined therein.

It is possible to receive HDDs of different sizes by changing the distance of the first through holes 127, with no restriction to 2.5-inch or 3.5-inch sizes. In addition, the fasteners for locking the HDDs of different sizes are located at the side plate 125 and the adjoining top plate 126, so the size of a received HDD in the HDD mounting assembly 12 can be readily known by the locking location of the received hard disk.

While certain embodiments have been described and exemplified, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A hard disk drive (HDD) mounting assembly, comprising:
   a fixing plate; and
   a cover on the fixing plate, the cover comprising a side plate perpendicular to the fixing plate and a top plate opposite to the fixing plate, the side plate comprising a first through hole defined therein and a first fastener corresponding to the first through hole, and the top plate comprising a second through hole defined therein and a second fastener corresponding to the second through hole, such that only one of two kinds of HDD is fixable in the HDD mounting assembly at any one time, according to user selection, the two kinds of HDD being an HDD of a first size and an HDD of a second size, the first size being different from the second size, the HDD of the first size being selected to be fixed in the HDD mounting assembly by the first fastener passing through the first through hole, and the HDD of the second size being selected to be fixed in the HDD mounting assembly by the second fastener passing through the second through hole.

2. The HDD mounting assembly of claim 1, wherein one end of the fixing plate has a fixing through hole defined therein, and the other end of the fixing plate has a flange located opposite to the fixing through hole.

3. The HDD mounting assembly of claim 1, wherein at least one of the first fastener and the second fastener is a screw.

4. The HDD mounting assembly of claim 1, wherein the first size and the second size are respectively 3.5-inch and 2.5-inch.

5. A computer case, comprising:

a shell containing a bottom plate; and a hard disk drive (HDD) mounting assembly assembled on the bottom plate of the shell, the HDD mounting assembly comprising a fixing plate and a cover on the fixing plate, the cover comprising a side plate perpendicular to the fixing plate and a top plate opposite to the fixing plate;

the side plate comprising a first through hole defined therein and a first fastener corresponding to the first through hole, and the top plate comprising a second through hole defined therein and a second fastener corresponding to the second through hole, such that only one of two kinds of HDD is fixable in the HDD mounting assembly at any one time, according to user selection, the two kinds of HDD being an HDD of a first size and an HDD of a second size, the first size being different from the second size, the HDD of the first size being selected to be fixed in the HDD mounting assembly by the first fastener passing through the first through hole, and the HDD of the second size being selected to be fixed in the HDD mounting assembly by the second fastener passing through the second through hole.

6. The computer case of claim 5, wherein one end of the fixing plate has a fixing through hole defined therein and a third fastener engaged in the fixing through hole, and the other end of the fixing plate has a flange located opposite to the fixing through hole.

7. The computer case of claim 6, wherein the bottom plate of the shell comprises a threaded post and tabs defined therein, the threaded post and the tabs are respectively matched with the fixing through hole and the flange, and the HDD mounting assembly is fixed to the bottom plate by the third fastener locking through the fixing through hole.

8. The computer case of claim 5, wherein the HDD mounting assembly is installed in proximity to access an opening defined in a sidewall of the shell.

9. The computer case of claim 5, wherein at least one of the first fastener and the second fastener is a screw.

10. The computer case of claim 5, wherein the first size and the second size are respectively 3.5-inch and 2.5-inch.

* * * * *